June 14, 1927. E. B. THURSTON Re. 16,658
CONTROL MECHANISM
Original Filed Nov. 12, 1921 2 Sheets-Sheet 1
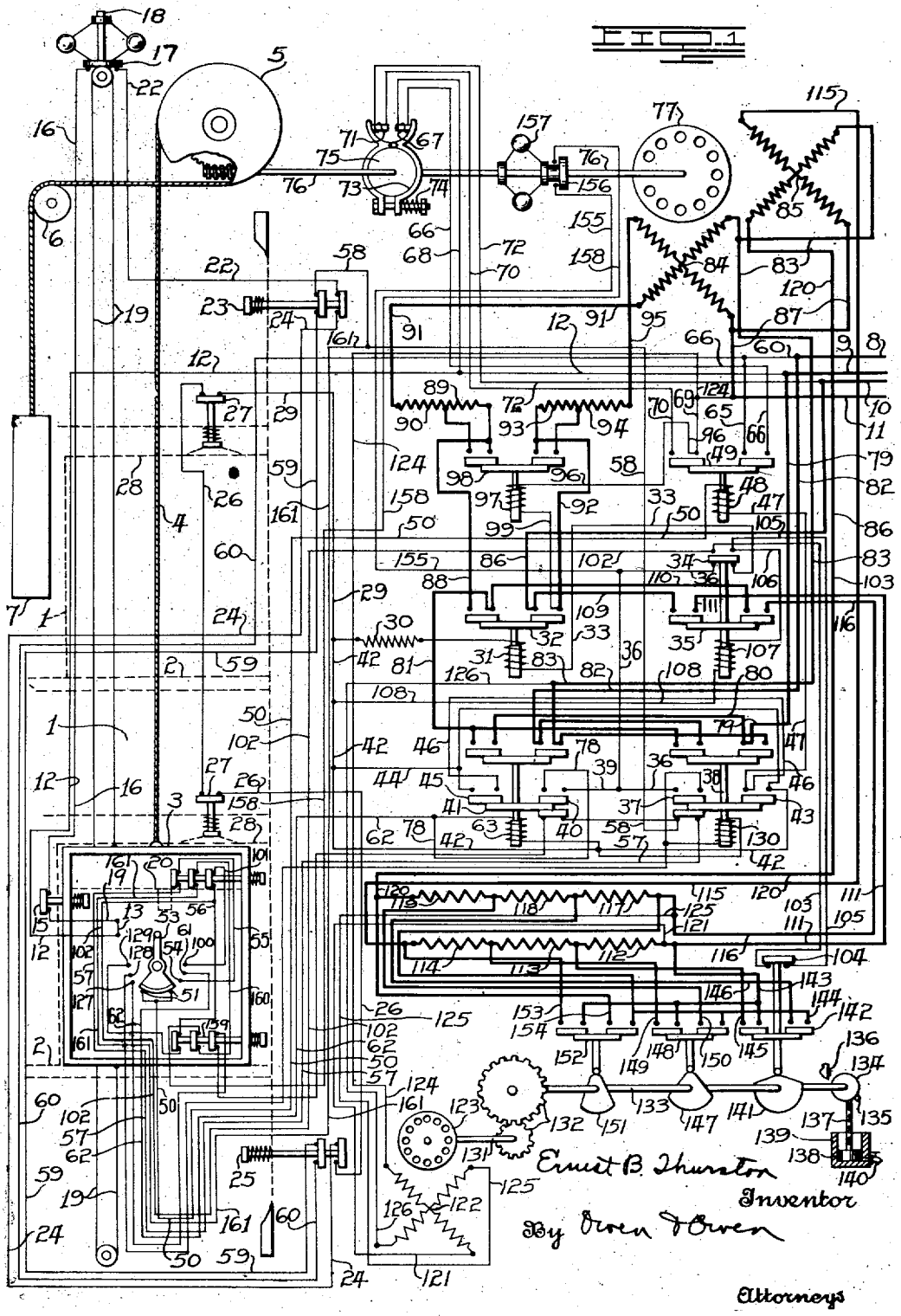
Ernest B. Thurston
Inventor
By Owen & Owen
Attorneys June 14, 1927. Re. 16,658

E. B. THURSTON

CONTROL MECHANISM

Original Filed Nov. 12, 1921 2 Sheets-Sheet 2

Ernest B. Thurston Inventor

By Owen & Owen

Attorneys

Reissued June 14, 1927. Re. 16,658

UNITED STATES PATENT OFFICE.

ERNEST B. THURSTON, OF TOLEDO, OHIO, ASSIGNOR TO THE HAUGHTON ELEVATOR & MACHINE CO., OF TOLEDO, OHIO, A CORPORATION OF OHIO.

CONTROL MECHANISM.

Original No. 1,585,518, dated May 18, 1926, Serial No. 514,584, filed November 12, 1921. Application for reissue filed March 3, 1927. Serial No. 172,525.

This invention relates to the control of electrically operated equipment.

This invention has utility when incorporated as an elevator controller equipped with an alternating electric current drive, having advantages for smoothness of operation at high speeds, especially in ranges above 250 ft. per minute, and even up to elevator speed maxima, the connections operable to effect gradual and quick pick-up on high speed with quick but gradual stopping obtained by having the control connections through the low speed.

Referring to the drawings:

Fig. 1 is a wiring diagram of an embodiment of the invention in a two-phase four-wire alternating electric current installation for elevator service;

Figure 3:
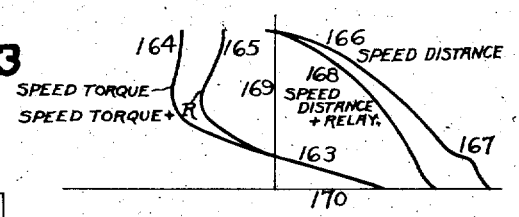
Fig. 3 shows motor operation curves hereunder.
Figure 2:
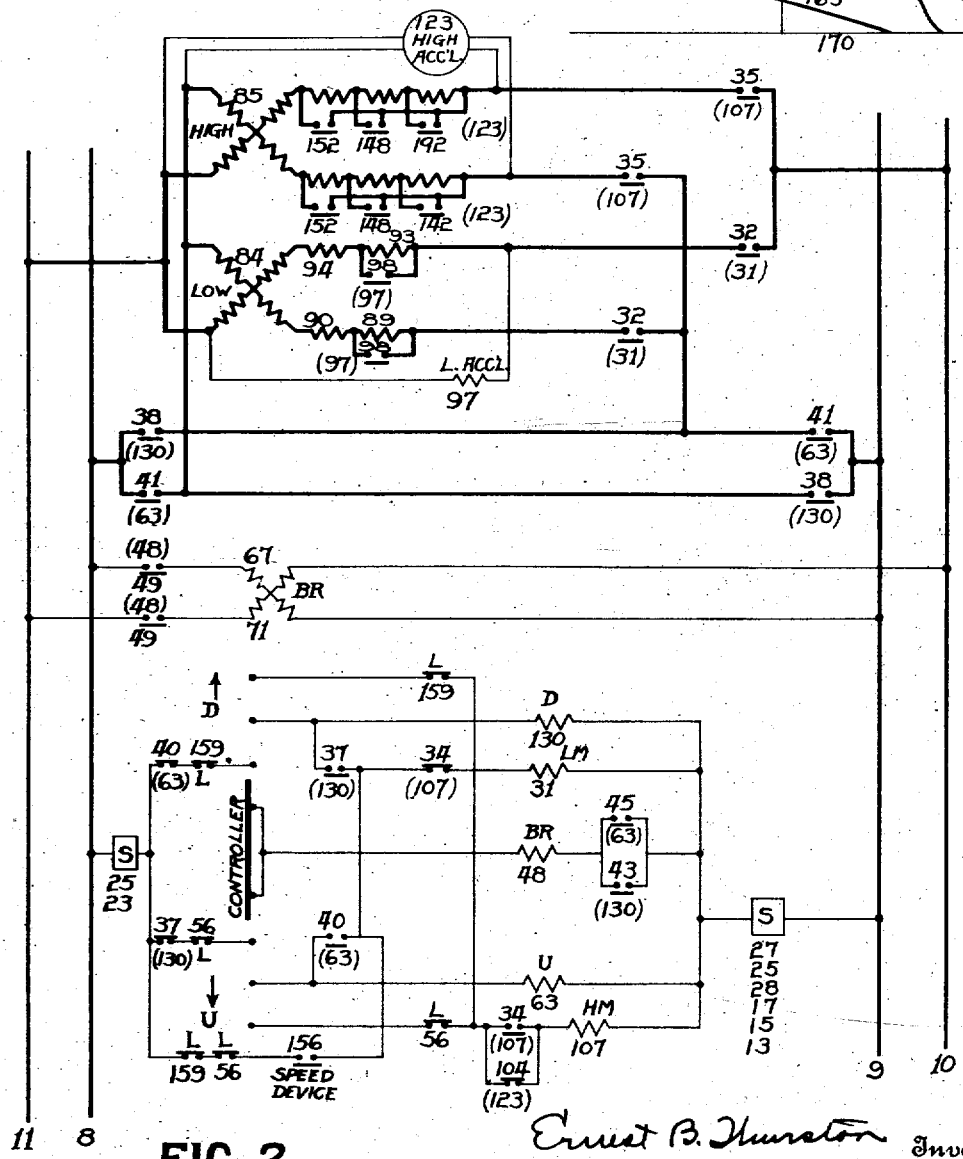
Fig. 2 is an across-the-line analysis of the installation diagram of Fig. 1, the reference characters in parentheses indicate the operator for the switch adjacent which said reference character is placed.

In elevator shaft 1 are landings 2 for elevator car 3 in its travel as actuated from hoist line 4. This hoist line 4 extends from the car 3 upward about drum 5, and thence about idler 6 to counterweight 7.

Considering the wiring lay-out, power supply lines 8, 9, complete a phase, while lines 10, 11, are the power supply lines completing the other or second phase of the two-phase four-wire alternating current supply. The various safety devices and their interconnection with the controller are herein shown as in the phase supplied by the lines 8, 9.

The power supply line 9 has branch line 12 extending to emergency switch 13 on the car 3, located within reach of the operator of the car, and normally closed. From this emergency switch 13 on the car 3, extends line 14 to switch 15, closed when the car carried doors are closed and open when such doors are open, say at a landing. From this door interlock switch 15 line 16 extends to switch 17, opened by speed governor 18 driven by line 19 from the car 3 when the travel of the car 3 exceeds the speed or travel rate for which the governor is set. The door interlock switch 15 is shown opened by car door 20.

The speed controlled switch 17 has line 22 therefrom to upper overtravel switch 23, normally closed, and thence by line 24 to lower overtravel switch 25, also normally closed. From this switch 25, line 26 extends through landing door interlock switches 27, open if any landing door 28 be not closed; thence by line 29, resistance 30, through slow speed main switch coil 31 of slow speed main switch 32. Leading from this coil 31 is line 33 to interlock 34 at main high speed switch 35. With this switch 35 not thrown, the interlock 34 is closed, so that the line 33 is connected to line 36 extending to switch 37 as an interlock at down direction switch 38. This interlock 37 has the line 36 thereto also connected by line 39 to interlock 40 at up direction switch 41. These interlocks 37, 40, are open until the controller has operated to determine the direction the elevator car 3 is to travel. This means the slow speed main switch 32 has one side of the line to the coil 31 open until the direction for car travel has been determined. Furthermore, due to the interlock 34, even though the direction switch selected be thrown for energizing the coil 31, such coil is deenergized when the main high speed switch 35 is closed.

The slow speed main switch 32 has been described as connected into the control system herein disclosed between the power supply and interlocks on the direction switches 38, 41. The coil for releasing the motor shaft is also connected by interlocks for operation as a direction switch is thrown. To effect this sequence of control, the line 29 has branch 42 to interlock 43 at the down direction switch 38, and said interlock is open as this direction switch 38 is open. Line 44 from the line 42 extends to interlock 45 at the up direction switch 41. This interlock 45 is also open when the up direction switch 41 is open. When the up direction switch 41 is closed, the interlock 45 connects the line 44, through this interlock with line 46 extending back to the side of the interlock 43 away from the line 42 thereto. Accordingly, with either direction switch 38 or 41 closed, an interlock connects to line 47 and thence to coil 48 at brake releasing switch 49.

From this brake switch coil 48, line 50 extends to central terminal 51 engaged by contact 52 of controller 53 in the car 3. For up-direction travel of the car 3, the controller 53 has its upper end rocked to the left, shifting the contact 52 first to connect the terminal 51 with terminal 54 of line 55 to upper normally closed limit switch 56, thence by line 57 to the interlock 37 at the down direction switch 38. With this switch 38 open, the interlock 37 is in position for connecting the line 57 with line 58 extending to normally closed upper overtravel switch 23, and thence by line 59 past lower overtravel switch 25, also normally closed. From this switch 25, the line 59 is connected by line 60 to the main power supply line 8. The safety devices are all in series as to the phase of current supply from the lines 8, 9, but such circuit is open, due to the interlocks at the direction switches being both open.

Shifting of the controller 53 to have its contact 52 engage terminal 61 permits flow of the first energizing circuit from the supply line 8 by way of line 62 to energize coil 63 at the up direction switch 41. The other side of the coil 63 is connected by line 64 and the line 42, to the line 29, in communication with the supply line 9. The controller contact 52 is connectable for communication with the supply line 9.

This energizing of the up-direction switch coil 63, effects throwing of this switch 41, so positioning the interlock 45 that the lines 44, 46, 47, energize the coil 48 to throw the brake releasing switch 49. Branch line 65 from the power supply line 8 extends to this switch 49, and as this switch is closed is connected to line 66 to brake coil 67, thence by line 68 completing circuit to the supply line 9. Simultaneously branch line 69 from the supply line 11, extending to the switch 49 is connected to line 70 to brake coil 71, having line 72 therefrom to the power supply line 10. The switch 49 has thus served to energize both coils 67, 71, of the brake for operating brake shoes 73 against the holding action of spring 74, to release brake drum 75 on shaft 76 so that motor 77 may be operated to drive the drum 5 for effecting elevator car travel in up direction. As this up-direction switch 41 is thrown to closed position, the interlock 40, has connection with the line 62, by way of the lines 39, 36, the interlock 34 at the main high speed switch 35 and thence by the line 33 to energize the coil 31 at the switch 32. This slow speed main switch coil is energized inasmuch as the line 33 is thus connected to the supply line 9, while the line 62 is connected to the supply line 8.

The control of the power lines as brought about by closing the switch 41 for up-direction travel, may now be considered. The power supply line 9 has branch 79 to the down direction switch 38, and line 80 therefrom to the up-direction switch 41. This line 80 is connected by the closing of this switch 41 to the main slow speed switch 32, by line 81. The power supply line 8 has branch 82 to the up-direction switch 41, connected by the closing of this switch 41, to line 83 extending to low speed winding 84 and to high speed winding 85 for the motor 77.

The power supply lines as controlled by the main slow speed switch 32 connect the resistance for slow speed starting of the motor 77. The power supply line 10 has branch 86 to this switch 32, while the other side of this phase has connection from the power supply line 11 by way of line 87 directly to the windings 84, 85, at the motor 77. As this main slow speed switch 32 is closed, it connects the line 81 by line 88 through resistances 89, 90, and line 91 to the slow speed winding 84 for completing the phase therewith as to the line 83. The closing of this slow speed switch 32, connects the line 86 to line 92 through resistances 93, 94, and by way of line 95 to complete the second phase with the line 87 at the slow speed winding 84 for the motor 77. The motor 77 is accordingly fully connected up for starting and its shaft 76 is released to permit such starting for moving the car 3 upward.

The acceleration of the slow speed operation of the motor 77 is brought about automatically after the main slow speed switch 32 is closed. From the line 69 at the brake releasing switch 49 extends line 96 to coil 97 at slow speed accelerating switch 98, and from thence by way of line 99 to the line 92 at the switch 32. The slow speed accelerating switch 98 is accordingly thrown immediately the switch 32 is thrown. The throwing of this switch 98 cuts out resistor comprising resistances 89, 93, as the motor 77 is getting under way for more rapid building up of the starting of this motor 77. However, the resistor comprising resistances 90, 94, is left in as current modifying means.

The starting of the motor 77, as herein described has been by step by step shifting of the controller 53. In practice, more especially in passenger elevator service, the shifting of the controller 53 is so rapid that actually there is not slow speed winding operation for starting the motor 77, but the starting is on high speed with the automatic acceleration therefor. Accordingly the shifting of the controller 53 to have its contact 52 engage terminal 100 brings about control connections as usual for quick acceleration in starting the car 3.

The high speed point or terminal 100 at the controller is connected by line 101 past normally closed upper limit switch 56, thence by way of line 102 to the interlock 34 at the main high speed switch 35. As this interlock 34 is open to the line 102 until this switch 35 is closed, there is no control action as yet in this line. The line 102, has branch 103 to interlock 104 connected in the torque motor automatic high speed acceleration control. As the torque motor is not started, this interlock 104 is closed and there is permitted current flow to the line 103. by way of line 105 extending to line 106 on the same side of open interlock 34 as the lines 102, 103. This line 105 has branch line 106 to main high speed switch coil 107, at the switch 35, with line 108 therefrom to the lines 42, 29.

The completion of the circuit through the coil 107, in throwing the main high speed switch 35, operates the interlock 34 for de-energizing the main slow speed switch coil 31, insuring that such switch 32 is open. This shifting of the interlock 34, shorts the energizing circuit for the coil 107, from the line 102 to the line 106, thereby making the continued holding of this switch 35 closed independent of any position the interlock 104 may now assume. This interlock 104 at the acceleration mechanism for the high speed motor connections, insures that such acceleration devices re in the starting position before the high speed main switch 35 is thrown to closed position.

The closing of this main high speed switch 35 controls power supply current by way of lines 109, 110, respectively from the lines 86, 81, on the supply side of the switch 32. The line 109 is connected by closing the switch 35 with line 111 through resistor comprising resistances 112, 113, 114, and line 115 to complete a phase with the line 87 at the high speed winding 85 for the motor 77. Simultaneously, the line 110 is connected through line 116, resistor comprising resistances 117, 118, 119, and line 120 to complete the second phase of the two-phase energizing current for the high speed winding 85 of the motor 77 with the line 83.

From the line 111 is branch 121 extending to windings 122 of torque motor 123, completing the first phase for this motor by way of line 124 as a branch of the line 11. The line 116 has a branch 125 to the second winding of the windings 122 for the torque motor 123. The phase of this second winding is completed by line 126 as a branch of the line 83. It will thus be seen that immediately the main high speed switch 35 is closed, energizing current is supplied for starting the torque motor 123.

This torque motor 123 is operable as a rotating magnetic field type of electromagnet with travel limited to slightly less than 360°. The driven structure is so designed that the sequence of operations may occur regardless of the direction of the shifting of this motor 123. This is a factor of importance, for when the controller 53 is shifted to have its contact 52 engage the terminals 127, 128, 129, corresponding for down direction driving of the elevator car 3, with the up direction driving control terminals 54, 61, 100, respectively, there is reversal of phase relations in the energizing of coil 130 at the down direction switch 38.

Accordingly, regardless of the direction of operation, the torque motor 123 rotates shaft 131, and through speed reduction gearing 132 gives shaft 133 carrying disk 134 with lug 135, a travel of slightly less than 180° as determined by stop 136. A lag or controllable time interval for this operation of the rotary electromagnet or torque motor 123 is brought about by connection 137 from the disk 134. This flexible connection 137 extends to weighted piston 138 as a recover travel centering or idle positioning finding device for the shaft 133. This piston 138 is guided in its travel by cylinder 139 having leakage control adjustable valve 140, varying the retarding action in this dashpot assembly.

As the shaft 133 starts to operate, cam 141 throws switch 142, not only opening the interlock 104, but by branch lines 143, 144, respectively from the lines 111, and 116, connects by lines 145, 146, to cut out resistances 112, 117. In the starting of the motor 77, there is thus an automatic cutting out of acceleration resistance for aiding in rapid pick-up of the motor 77 in coming up to speed.

Further rotation of the shaft 133, through cam 147 closes switch 148, effective through lines 149, 150, to cut out high speed acceleration resistances 113, 118. Thereafter, the continued rotation of this shaft 133, throws cam 151, closes switch 152, and through lines 153, 154, cuts out the last resistances 114, 119, of the high speed acceleration for the motor 77.

Assuming the motor 77 has a normal speed for operation of 900 R. P. M., the automatic feature herein for adequately handling the stopping of the equipment smoothly, may be thrown in say at 200 R. P. M. The motor 77 as described, while two-speed in its windings and control connections, may be started directly on high speed, even at all times, should such be desired. The slow speed worked out in the automatic control connections herein, has peculiar advantages in slowing down and stopping.

By throwing the controller 53 from the position with the contact 52 engaging the terminal 100, back so that the contact 52 is clear of the terminal 100, but still engages the terminals 61, 54, while the motor 77 is still running above 200 R. P. M., there may occur an automatic braking or slowing down of the motor 77 independently of any release of the brake shoes 73 for gripping the drum 75. As this is a speed control feature, a governor is connected up for some of this control operation. As this speed retarding action is not mechanical in applying the brake shoes 73 for wear, it is a feature of importance in installation upkeep, even as a safe-guard for insuring first slowing down of the motor; for if the controller 53 be thrown into reverse travel selection direction, this slowdown first occurs before power current is supplied for such reverse direction of travel, thereby avoiding excessive current consumption at the motor. This braking occurs by throwing the electric current into the slow speed windings 84, with the acceleration resistances 89, 93, out, but the permanent resistances or motor slowing down current modifying means 90, 94, in. The speed of the motor 77 being above that for which the slow speed motor is designed, said latter speed say being 150 R. P. M., the electric current through the windings 84 brings about a most effective retarding generator action, electrically loading the equipment for slowing down. The operation is an over speed propulsion of the motor beyond the synchronous speed of the windings 84. In order that such may not be too abrupt at the outset and may build up a little as a cushioning effect, the resistances 90, 94, as permanently in series with the windings 84, may be proportioned to the mass and speed of the moving parts. This is a factor permitting accurate adaptation of alternating current electric motors of a commercial design to a wide range of installations.

With the controller 53 off the high speed terminal 100, the main high speed switch 35 opens, and the interlock 34 falls to have the main slow speed switch 32 closed. The torque motor 123 is de-energized, and the weight 138 resets the shaft 133, opening the switches 142, 148, 152, and closing the interlock 104. As the controller 53 has its contact 52 only off the terminal 100, but still engages the terminal 61, the brake coils 67, 71, are still energized, and the beyond synchronous speed braking action of the windings 84 is thus far doing all the work of slowing down.

Should the controller be shifted back away from the terminal 61, and off the terminal 54, the brake coils 67, 71, are de-energized, and the brake switch 49 is opened. The interlock 40 holds the up direction switch 41 in as long as the switch 156 is closed. If this shifting of the controller 53 occurs before the motor 77 is down to a speed of say 200 R. P. M., the coils 31 and 63 are not deenergized. The circuit from the line 9 through the safety devices, including the emergency switch, car door switch, car travel governor switch, upper and lower overtravel hatch limit switches, and landing door interlocks to the lines 29, 30, through the coil 31, thence by the line 33, through the interlock 34, to line 155 as a branch of the line 36, while from the line 29 to the line 42 there is connection of the coil 63 by way of the lines 62, 78, the interlock 40, and the lines 39, 36, to switch 156 held closed by governor 157 on the shaft 76, as long as such shaft is rotating at a speed above that selected for the throwing out of this switch 156, and herein taken as an example as 200 R. P. M. From this switch 156, as in an auxiliary control means having a speed responsible device actuator therefor, extends line 158 past normally closed down limit switch 159, thence by line 160 past normally closed upper limit switch 56, by line 161 to the line 58, connecting through the overtravel switches with the line 60 to the line 8.

There is accordingly a holding of the switch 32 in closed position at all times when the controller 53 is shifted toward or past elevator car stopping position off the high speed terminal, so long as the motor shaft 76 is rotating in excess of the 200 R. P. M. for which the speed responsive switch 156 is set to open. So, whether or not the controller 53 be only just off the high speed terminal, or back to neutral central position, the above synchronous speed braking of the shaft 76 by the slow speed windings 84 automatically occurs, with the permanent resistances 90, 94, in. The switch 156 is accordingly operable independently of the controller 53. The action of this switch 156 is such that at all slowing down or stopping operations, the higher travel speeds are retarded. Inasmuch as the holding action of brake shoes is inversely proportional to the speed, the greater wear regions in control may be handled exclusively by the generator action of the slow speed windings when the operation is above the synchronous speed thereof, or instead of being exclusive, for the more rapid, but still smooth stopping, there may be supplementing of such electrical braking by mechanical braking action of the shoes 73 upon the drum 75 as forced by the spring 74. As the speed of the shaft 76 falls below 200 R. P. M., the switch 156 opens, and the coil 31 is de-energized, opening the switch 32, thereby cutting out the windings 84. The final slowing up of the motor 77 is accordingly handled solely by the brake spring 74. While the motor 77 is operating in the range of the higher synchronous speed of the windings 85, but with such windings cut out, due to the controller position, or the operation of some stopping device, the action of the switch 156 in holding the windings 84 in for generator braking action, builds up such braking action as the motor 77 slows down due to the permanent resistances 90, 94.

For illustrative purposes, reference may be had to Fig. 3 having speed ordinates and torque-distance abscissæ. Curve 163 indicates the torque-speed curve of the motor 77 connected up for slow speed starting with line voltage on the windings 84 and no resistance in series, that is, without permanent resistances 90, 94. Curve 164 is the torque-speed characteristic of such slow speed motor operating as a generator or acting as a brake from the high-speed operation of the motor down to the slow speed operation. The bow in this curve away from the ordinate indicates that there is a building up or increase in this braking action as the speed decreases from the high speed maximum, and such bow, introduces a cushioning in this braking action for stopping the elevator. With the introduction of the resistances 90, 94, in series with the slow speed windings 84 of the motor 77, the harshness of the curve 164 is further modified to approximate curve 165. Accordingly these resistances tend to lessen the torque. These resistances 90, 94, are held in together with the windings 84 by the speed control or automatic switch 156 controlled by the governor 157 as long as the shaft 76 is rotating above 200 R. P. M., even though the controller 53 be shifted to central off position.

If the controller 53 be shifted only to cut out the high speed motor windings 85 by moving off the terminals 100 or 129, that is, back to the terminal 61 or to the terminal 128, the brake coils 67, 71, remain energized and the slow speed motor with its windings 84 in series with the permanent resistances 90, 94, acts alone in braking as shown by speed-distance curve 166. The further shifting of the controller 53 to the off position, as the automatic switch 156 is opened, has the brake spring 74 take hold in completing the stopping of the elevator as shown by curve 167.

When the controller 53 is shifted to the full off position from full on position, there is not only the generator braking action of the slow speed motor windings 84 as modified by the resistances 90, 94, but such is supplemented by the brake spring 74, and there is automatically effected a smooth, but even more rapid emergency braking or slowing down of the elevator car 3 as shown by curve 168, due to the simultaneous braking effect of the electromagnetic brake and the generator action of the motor. The word "supplementing" as used in some of the claims is intended to define this simultaneous action of the two braking mediums.

With the holding action of the brake shoes by friction inversely proportional to the speed, the more arduous and wear promoting range is taken by the dynamic braking of the slow speed motor. The harshness of the braking action of no resistance in the slow speed windings is modified by the resistances 90, 94, which, in practice, are proportioned to the kinetic energy of the traveling mass, in order that the taking hold for stopping may not mean a jerk. The slow speed motor design to increase the generator load as the shaft 76 slows down from the high speed, is shown by the curve 165 arching away from vertical speed ordinate 169 as the curve shows speed drop toward abscissa 170. This is an additional factor in according maximum slowing up action with a cushioning at the initial taking hold upon the cutting out of the high speed motor. Taking the holding action of the brake by the spring 74 as one at the full speed of the motor 77 of 900 R. P. M., then upon the cutting out of the switch 156 when the motor 77 is down to 200 R. P. M., the work given such brake would be as eighty-one into four, or slightly over one twentieth the work required of the brake at the full speed of the motor. In brake design, this means great economy with less wear and tear in an installation of superior smoothness of control.

The generator braking by the slow speed motor windings 84 is in the region above the synchronous speed for such motor, and the final slowing up of the last stages of stopping is handled solely by the brake spring 74. The brake spring 74 may work in conjunction with the slow speed motor windings 84 and the resistances 90, 94, at the higher speeds, or, as held out by the controller 53, not come in until the automatic control switch 156 has acted, or is about to act.

It is to be noted the torque motor for the acceleration switches is connected to the power motor for the elevator and the energizing current for the torque motor is through lines at all times directly connected with windings of the power motor independently of main line or direction switches therebetween. This connection of this rotating field magnet or torque motor is directly connected to the winding of the motor even though there may be resistance between the line current supply and the windings of the power motor with the connections to the torque motor as more remote from the power motor than said resistance. Therefore it follows, operation of this torque motor does not depend upon the operation of any switch between the power motor and torque motor.

The torque motor, as herein shown, is inoperative when supplied with a single phase, and therefore gives a protection against the failure of a switch contact in that it does not short circuit the resistance in such a failure, and thus does not allow the power motor winding to be directly across the line on a single phase without resistance. It will be understood that the resistors 89, 90, 93 and 94 operate as decelerating as well as accelerating resistors, and that wherever the term "accelerating resistor" or "accelerating resistance" is used in the claims, the term is intended to cover both accelerating and decelerating resistors.

The invention disclosed herein, in so far as there may be disclosure of common subject matter with my copending applications for United States Letters Patent, as developing into Patents 1,529,675 of March 17, 1925, and 1,573,207 of February 16, 1926, each filed August 23, 1919, is a continuation thereof.

What is claimed and it is desired to secure by Letters Patent is:

1. The combination with an elevator, a multi-speed alternating current motor for operating the elevator, said motor having a primary winding, a controller for the motor, a resistor for the motor in series with said primary winding, and means comprising a speed responsive switch for maintaining a short circuit across a portion only of said resistor above a predetermined speed of the motor when said controller is shifted from motor actuating to motor stopping position.

2. An elevator, a two speed alternating electric current actuator including a motor for operating the elevator, said motor having a low speed primary winding, a power supply for the motor, a permanent resistor connected at all times and only with the low speed primary winding for the motor, a controller for the motor, and means comprising a speed responsive switch and connections thereto from the power supply bypassing the controller for maintaining the low speed winding connected to the power supply when said switch is closed and the controller moved from such direction of motor running control.

3. An elevator, a two speed alternating electric current motor for operating the elevator, said motor having a low speed primary winding, a power supply for the motor, a permanent resistor connected at all times and only with the low speed primary winding, a starting resistor for the low speed primary winding, a controller for the motor, and means comprising a centrifugal speed device connected to be driven with said elevator by said motor, a switch operable by said device, and connections thereto from the power supply bypassing the controller for maintaining the low speed winding connected to the power supply when said switch is closed and the controller moved from such direction of motor running control, said means, with the controller in off position and the power supply connected to said low speed winding, being operable to cut off said power supply from the low speed primary winding and the permanent resistor before the motor stops.

4. An elevator, a motor therefor, two speed windings for the motor, an alternating electric current power supply for the motor, an electromagnetically released brake for the elevator, a controller for controlling the connection of the supply to the brake and motor, and means for supplementing the retarding action of the brake comprising a speed responsive switch and connections thereto from the power supply bypassing the controller for maintaining said current supply to the lesser speed winding when said switch is closed and the controller moved from such direction of motor running control.

5. Actuating means for an elevator comprising an alternating electric current power supply, an electric motor provided with windings for one synchronous speed and windings for a less synchronous speed, a resistor connected at all times and only with said less synchronous speed winding, an accelerating resistor for said less synchronous speed winding, and means for maintaining said current supply to said less synchronous speed winding and first resistor above synchronous speed of said less synchronous speed winding.

6. A motor, an alternating electric power supply therefor, high and low synchronous speed windings for the motor, a permanent resistor connected at all times and only with said low synchronous speed winding, an accelerating resistor for said low synchonous speed winding, control means for the motor operable for disconnecting the supply of current to the motor prior to stopping, auxiliary control means for connecting said low synchronous speed winding for generator action of the motor in stopping, cutting out said accelerating resistor and maintaining said supply to said low synchronous speed winding and permanent resistor, and a brake for completing the stopping of the motor.

7. An alternating current motor having a power winding, a shaft for the motor, a brake for the shaft, means normally setting the brake, an alternating electric current power supply for the motor, and means for establishing dynamic braking connections between said motor and supply comprising current modifying means for the motor thereby supplementing the brake for stopping the motor.

8. In a motor control system, a motor, a high speed winding for the motor, a second speed winding for the motor, an accelerating resistor for the high speed winding, an accelerating resistor for the second speed winding, high and second speed switches for the motor, a controller for the switches and second speed resistor, and a rotating field magnet connected on the same side of said high speed switch as said motor for controlling the cutting out of said high speed resistor.

9. In a motor control system, a motor, high and second speed windings for the motor, a permanent resistor and a starting resistor for the second speed winding, a starting resistor for the high speed winding, high and second speed switches for the motor, a controller shiftable from an off position to control the switches, and a rotating field magnet connected on the same side of said high speed switch as said motor for controlling the cutting out of said high speed resistor.

10. An elevator, a two speed alternating electric current actuator therefor including a motor having a low speed primary winding, a power supply for the motor, and means for establishing dynamic braking connections between said motor and supply comprising permanent current flow modifying means consisting of relatively fixed elements connected at all times and only with said low speed primary winding.

11. A motor having first and second main switches, direction switches, a controller shiftable from an off position to control a direction, the first main and then the second main switches, connections for the motor through the first main switch, starting resistance from the second main switch, a speed controlled switch effective when the controller is shifted from the on position for the second switch for establishing connections for generator action in retarding the motor, a rotating magnetic field magnet for controlling the cutting out of the starting resistance, rotating magnetic field magnet switch means permitting controller direct control of the second main switch, and switch means at the second main switch bypassing the magnet switch means as the second main switch is operated, said second main switch means coacting to cut out the first main switch.

12. A two speed motor, accelerating resistances for both speeds of the motor, a permanent resistance for the low speed motor operation, a rotating magnetic field magnet for cutting out the high speed resistance, and a controller for the speeds of the motor shiftable from high speed position for generator operation of the low speed motor as modified by said permanent resistance in retarding the motor.

13. A motor having a low speed connection, a first main switch therefor, accelerating resistance therefor, a low speed acceleration switch controlled for being thrown in automatically after the first main switch, a permanent resistance for said low speed motor connection, said motor also having a high speed connection, a second main switch therefor, accelerating resistance for the high speed motor connection, a rotating magnetic field magnet for cutting out the high speed motor accelerating resistance, a controller for the motor speeds, and a switch effective with the controller thrown back from on position in such direction for cutting out the low speed connection and resistance as the motor slows down from high speed operation.

14. An alternating current electric motor, and control means for the stopping thereof embodying an electromagnetic brake, permanent resistance and additional resistance insertable with the motor for thereby lessening the torque of the motor, a controller for the motor, and a speed device for holding the motor and permanent resistance connected during retarding operation of the motor for a decrease of the motor operative rate to a determined speed, said controller being also operable for bringing about retarding operation of said brake.

15. An alternating current electric motor, and control means for the stopping thereof embodying permanent resistance and additional resistance insertable with the motor for thereby lessening torque of the motor, a controller for the motor, and a speed device for holding the motor and permanent resistance connected during retarding operation of the motor for a decrease of the motor operative rate to a determined speed.

16. In a control system, a motor, a line switch for the motor, polyphase power supply lines for the motor, a controller shiftable from an off position to control the switch, a primary winding for the motor connected to the switch, a motor starting resistor, and a rotating magnetic field magnet having polyphase connection to said supply lines and on the same side of said switch as said motor for controlling the cutting out of said resistor.

17. In a control system, a motor, high and second speed switches for the motor, a controller shiftable from an off position to control the switches, a second speed primary winding for the motor connected to the second speed switch, a motor starting resistor between the motor and the high speed switch, a high speed winding for the motor, a power supply for the motor, a rotating magnetic field magnet connected on the same side of said switches as said motor for controlling the cutting out of said resistor, and means comprising a speed responsive switch and connections thereto from the power supply bypassing the controller for maintaining said power supply to said second speed primary winding above a predetermined speed of said motor when said switch is closed and the controller moved from such direction of motor running control.

18. An alternating current electric motor having high speed windings and low speed primary windings, and a permanent resistor located outside of and connected at all times in circuit with one of said low speed primary windings.

19. An alternating current electric motor having high speed connections and low speed connections, and a resistor permanently connected in the low speed connection power supply circuit.

20. In an elevator, a multi-speed alternating electric current actuator therefor including a motor having a power circuit, a power supply for the motor, means for establishing dynamic braking connections between said motor and supply, and current flow modifying means consisting of relatively fixed elements connected in the power supply circuit during said dynamic braking action.

21. In a multi-speed motor, a permanent resistor in the power supply circuit for one of the lower speeds, and a controller for the speeds of the motor which when shifted to said lower speed from a higher speed position results in generator action of the motor, said action being modified by said permanent resistor.

22. In an alternating current multi-speed motor, a current flow modifying means having permanent constants and so located in the primary circuit as to at all times affect the generator action of the motor in slowing down.

23. An alternating current electric motor having high speed winding connections and low speed winding connections and permanent and accelerating resistors located in the low speed circuit.

24. Actuating means for an elevator comprising an alternating electric current power supply, an electric motor provided with windings for one synchronous speed and windings for a less synchronous speed, two resistors for said less synchronous speed windings, one of them being permanently connected with one of said windings.

25. A two speed alternating current motor, accelerating resistors for both speeds of the motor, a permanent resistor for the low speed motor operation, and a controller for the speeds of the motor which when shifted from high speed to low speed position results in generator action of the motor, said action being modified by said permanent resistor.

26. A motor having a low speed connection, a first main switch therefor, an accelerating resistor therefor, a low speed acceleration switch controlled for being thrown in automatically after said first main switch, a permanent resistor for said low speed motor connection, said motor also having a high speed connection, a second main switch therefor, an accelerating resistor for the high speed motor connection, a controller for the motor speeds, and a switch effective for cutting out the low speed connection and accelerating resistor as the motor slows down from high speed operation when the controller current supply is broken.

27. An alternating current electric motor, an alternating current power supply therefor, means for slowing down the speed of the motor embodying a permanent resistor in the motor circuit for lessening the torque of the motor, and an automatic device for holding the motor and resistor connected to the power supply during decrease of the motor speed to a predetermined rate.

28. An elevator, a multi-speed alternating electric current actuator including a motor for operating the elevator, said motor having low speed connections, a power supply for the motor, a permanent resistor connected at all times with one of the low speed connections for the motor, a controller for the motor, and means comprising a speed responsive switch and connections thereto from the power supply bypassing the controller for maintaining said low speed connection to the power supply when said switch is closed and the controller current supply broken.

29. An elevator, a two speed alternating electric current motor for operating the elevator, said motor having a low speed primary winding, a power supply for the motor, a permanent resistor connected at all times with the low speed primary winding, a controller for the motor, a governor, a switch operated by said governor, and connections to said switch from the power supply bypassing the controller for maintaining the low speed winding connected to the power supply when said switch is closed and the control current supply broken, said governor, with the controller in off position and the power supply connected to said low speed winding, being operable to cut off said power supply from the low speed primary winding and the permanent resistor before the motor stops.

30. The combination with an elevator, a multi-speed alternating current motor for operating the elevator, a controller for the motor, a resistor for the motor, and means including a speed responsive switch for maintaining a short circuit around a portion only of said resistor above a predetermined speed when said controller is shifted from motor actuating to motor stopping position.

31. Actuating means for an elevator comprising an alternating electric current power supply, an electric motor provided with windings for one synchronous speed and windings for a less synchronous speed, a manually operated controller for the motor, a resistor connected with one of said less synchronous speed windings, and means independent of said manually operated controller for maintaining said current supply to said less synchronous speed windings and to said resistor when the motor is running at a predetermined speed above the synchronous speed of said less synchronous speed windings.

32. A motor, an alternating electric power supply therefor, high and low speed windings for the motor, a permanent resistor connected with said low speed winding, an accelerating resistor for said low speed winding, control means for the motor operable for disconnecting the supply of current to the motor prior to stopping, auxiliary control means for maintaining said low speed winding connected for generator action of the motor in slowing down, and a brake for completing the stopping of the motor.

33. In an alternating current electric motor, a power supply therefor, a mechanical brake therefor, and means including a controller for dynamic braking of said motor and whereby the operator can at will cause said mechanical brake to be applied simultaneously with the dynamic brake without cutting off the power supply to the motor.

34. In an alternating current electric motor, a power supply therefor, a mechanical brake therefor, and means including both manually operated and automatic controllers for dynamic braking of said motor and whereby the operator can at will cause said mechanical brake to be applied simultaneously with the dynamic brake without cutting off the power supply to the motor.

35. An alternating current electric motor, an alternating current power supply therefor, a mechanical brake therefor, a controller for the motor, and an automatic device for holding the motor connected to the power supply and causing dynamic braking during decrease of the motor speed to a predetermined rate, said controller being operable for bringing about simultaneous dynamic and mechanical braking action with the motor so connected.

36. An alternating current multi-speed electric motor having a power winding, an electromagnetic brake for the motor, a current power supply for the motor and brake, means for maintaining said supply to said winding to insure dynamic braking action during motor deceleration while the motor is rotating above a predetermined speed, and means for applying said electromagnetic brake at will independent of the speed of the motor and while said power supply to said winding is maintained.

37. An elevator, a multi-speed alternating electric current actuator therefor, an alternating electric current power supply for the actuator, a brake for the actuator, means for reducing the speed of the actuator without setting the brake, and means for continuing the power supply to the actuator after setting the brake, thereby producing simultaneous braking action of said two braking means.

38. An elevator, a motor therefor, two speed windings for the motor, an alternating electric currrent power supply for the motor, a brake for the elevator, a controller for controlling the connection of the supply to the brake and motor, and means for securing braking action by the motor in addition to and simultaneously with the braking action of said brake, said means comprising a speed responsive switch and connections thereto from the power supply for maintaining said current supply to the low speed winding when said switch is closed and the controller current supply broken.

39. An elevator, a reversible multi-speed alternating electric current actuator, an alternating current electric supply for the actuator, a brake for the actuator, means for reducing the speed of the actuator without setting the brake, means for setting the brake independent of the speed of the actuator and without cutting off the power supply to the actuator, and means for establishing dynamic braking connections between the actuator and power supply when the actuator is moving in either direction.

40. An elevator, a multi-speed alternating electric current actuator therefor, an alternating electric current power supply for the actuator, a brake for the actuator, means for reducing the speed of the actuator without setting the brake, dynamic braking connections between the actuator and power supply comprising current modifying means for the actuator, and means for setting the brake during dynamic braking action without cutting off the power supply to the actuator.

41. An alternating current electric motor, control means for stopping the motor embodying an electromagnetic brake, a permanent resistor in the motor circuit for lessening the torque of the motor, a controller for the motor, and a speed device for holding the motor and resistor connected to the power supply during retarding operation of the motor for a decrease of the motor operative rate to a predetermined speed, said controller being also operable for bringing about retarding operation of said brake.

42. An elevator, a multi-speed reversible alternating current motor therefor, an alternating current power supply for the motor, power connections for each speed, a controller operable to establish high speed running condition for the elevator, automatic means effective to establish low speed connection for the motor and to maintain such connection with the controller shifted from high speed position to motor reversal position, and connections from the controller for motor reversal which are rendered ineffective until said low speed connection is broken.

43. An elevator, a multi-speed reversible alternating current motor therefor, an alternating current electric power supply for the motor, power connections for each speed, a controller for the motor, a magnetic brake for the elevator normally applied when said controller is in neutral position, said controller being operable to release the brake and establish running conditions for the elevator, means effective to establish low speed connection for the motor and to maintain such connection when the controller is shifted from high speed position to motor reversal position, and connections from the controller for motor reversal and brake release which are rendered ineffective until said low speed connection is broken.

44. An elevator, a reversible motor therefor, high and low speed windings for the motor, an alternating current power supply for the motor, high and low speed switches for the respective windings, a controller operable to close the high speed switch and establish high speed running condition for the elevator without first establishing low speed running condition, and means comprising a speed responsive switch effective to provide connection with said current supply to the low speed winding and to maintain such connection with the controller shifted from said running establishing condition to motor reversal position, there being connections from the controller for motor reversal rendered ineffective until said speed responsive switch is opened.

45. A reversible motor, alternating electric current power supply therefor, accelerating means for the motor, accelerating switches for said accelerating means, reversing switch means for the motor, a rotating magnetic field magnet directly connected to the motor circuits independently of said reversing switch means for operating said accelerating switches, means other than said magnet for operating the reversing switch means, and a controller for operating the magnet in one direction for one direction of motor operation and in the opposite direction for the other direction of motor operation.

46. An alternating current electric motor, low and high speed windings for the motor, direction switches for the motor, accelerating means for one of said speed windings of the motor, accelerating switches for said accelerating means, a rotating magnetic field magnet directly connected to said set of speed windings independently of said switch means for operating said accelerating switches, means other than said magnet for operating the direction switches, and a controller for operating the magnet in one direction for one direction of motor operation and in the opposite direction for the other direction of motor operation.

47. In a motor control system, a motor, a high speed winding for the motor, a second speed winding for the motor, an accelerating resistor for the high speed winding, an accelerating resistor for the second speed winding, high and second speed switches for the motor, a controller for the switches, and a rotating field magnet connected on the same side of said high speed switch as said motor for controlling the cutting out of said high speed resistor.

48. A multi-speed motor, an accelerating resistor for the high speed circuit, a rotating magnetic field magnet for cutting out said resistor, and a permanent resistor so located as to modify the generator action of the motor in slowing down.

In testimony whereof, I have hereunto signed my name to this specification.

ERNEST B. THURSTON.